(12) United States Patent
Das et al.

(10) Patent No.: US 11,906,967 B1
(45) Date of Patent: Feb. 20, 2024

(54) DETERMINING YAW WITH LEARNED MOTION MODEL

(71) Applicant: Zoox, Inc., Foster City, CA (US)

(72) Inventors: Subhasis Das, Menlo Park, CA (US); Francesco Papi, Sunnyvale, CA (US); Shida Shen, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 678 days.

(21) Appl. No.: 16/836,568

(22) Filed: Mar. 31, 2020

(51) Int. Cl.
*G05D 1/02* (2020.01)
*G05D 1/00* (2006.01)

(52) U.S. Cl.
CPC ......... *G05D 1/0212* (2013.01); *G05D 1/0238* (2013.01); *G05D 1/0246* (2013.01); *G05D 1/0257* (2013.01); *G05D 2201/0212* (2013.01); *G05D 2201/0213* (2013.01)

(58) Field of Classification Search
CPC .. G05D 1/0212; G05D 1/0238; G05D 1/0246; G05D 1/0257; G05D 2201/0212; G05D 2201/0213
See application file for complete search history.

(56) References Cited

U.S. PATENT DOCUMENTS

| | | | | |
|---|---|---|---|---|
| 2016/0368492 | A1* | 12/2016 | Al-Stouhi | B60W 30/09 |
| 2017/0097410 | A1* | 4/2017 | Liu | G01S 13/589 |
| 2017/0169709 | A1* | 6/2017 | Ando | G08G 1/161 |
| 2019/0318206 | A1* | 10/2019 | Smith | G01S 17/931 |
| 2020/0020117 | A1* | 1/2020 | Daehler | G06T 7/70 |
| 2020/0111366 | A1* | 4/2020 | Nanri | B60W 30/10 |
| 2020/0160070 | A1* | 5/2020 | Sholingar | G06N 3/0445 |
| 2020/0249345 | A1* | 8/2020 | Alenljung | G01S 7/415 |
| 2021/0255307 | A1* | 8/2021 | Bongio Karrman | G01S 13/582 |
| 2021/0263525 | A1* | 8/2021 | Das | G06V 20/64 |
| 2023/0034560 | A1* | 2/2023 | Kamann | G01S 13/931 |

FOREIGN PATENT DOCUMENTS

| | | | |
|---|---|---|---|
| JP | 2013105335 A | * | 5/2013 |
| WO | WO-2021166425 A1 | * | 8/2021 |

OTHER PUBLICATIONS

A. Benterki, M. Boukhnifer, V. Judalet and M. Choubeila, "Prediction of Surrounding Vehicles Lane Change Intention Using Machine Learning," 2019 10th IEEE International Conference on Intelligent Data Acquisition and Advanced Computing Systems: Technology and Applications (IDAACS), 2019, pp. 839-843. (Year: 2019).*

D. Kellner, M. Barjenbruch, J. Klappstein, J. Dickmann and K. Dietmayer, "Tracking of Extended Objects with High-Resolution Doppler Radar," in IEEE Transactions on Intelligent Transportation Systems, vol. 17, No. 5, pp. 1341-1353, May 2016. (Year: 2016).*

* cited by examiner

*Primary Examiner* — Donald J Wallace
(74) *Attorney, Agent, or Firm* — Lee & Hayes, P.C.

(57) ABSTRACT

Techniques to use a trained model to determine a yaw of an object are described. For example, a system may implement various techniques to generate multiple representations for an object in an environment. Each representation vary based on the technique and data used. An estimation component may estimate a representation from the multiple representations. The model may be implemented to output a yaw for the object using the multiple representations, the estimated representation, and/or additional information. The output yaw may be used to track an object, generate a trajectory, or otherwise control a vehicle.

20 Claims, 6 Drawing Sheets

DETERMINING YAW WITH LEARNED MOTION MODEL

BACKGROUND

Many applications use information about objects that are present in an environment. For example, various autonomous systems, such as autonomous vehicles and autonomous drones, use data of objects to navigate within an environment. To do so, such autonomous systems determine information about the objects, including information about the size, location, state, and/or heading of the objects, for example. In some systems, an object can be represented "top-down," using a two-dimensional bounding box to represent extents of the object and a yaw angle to describe a heading or direction of the object. In some instances, a system includes various components that generate multiple representations for an object. However, object tracking and other processes often rely on a single representation.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
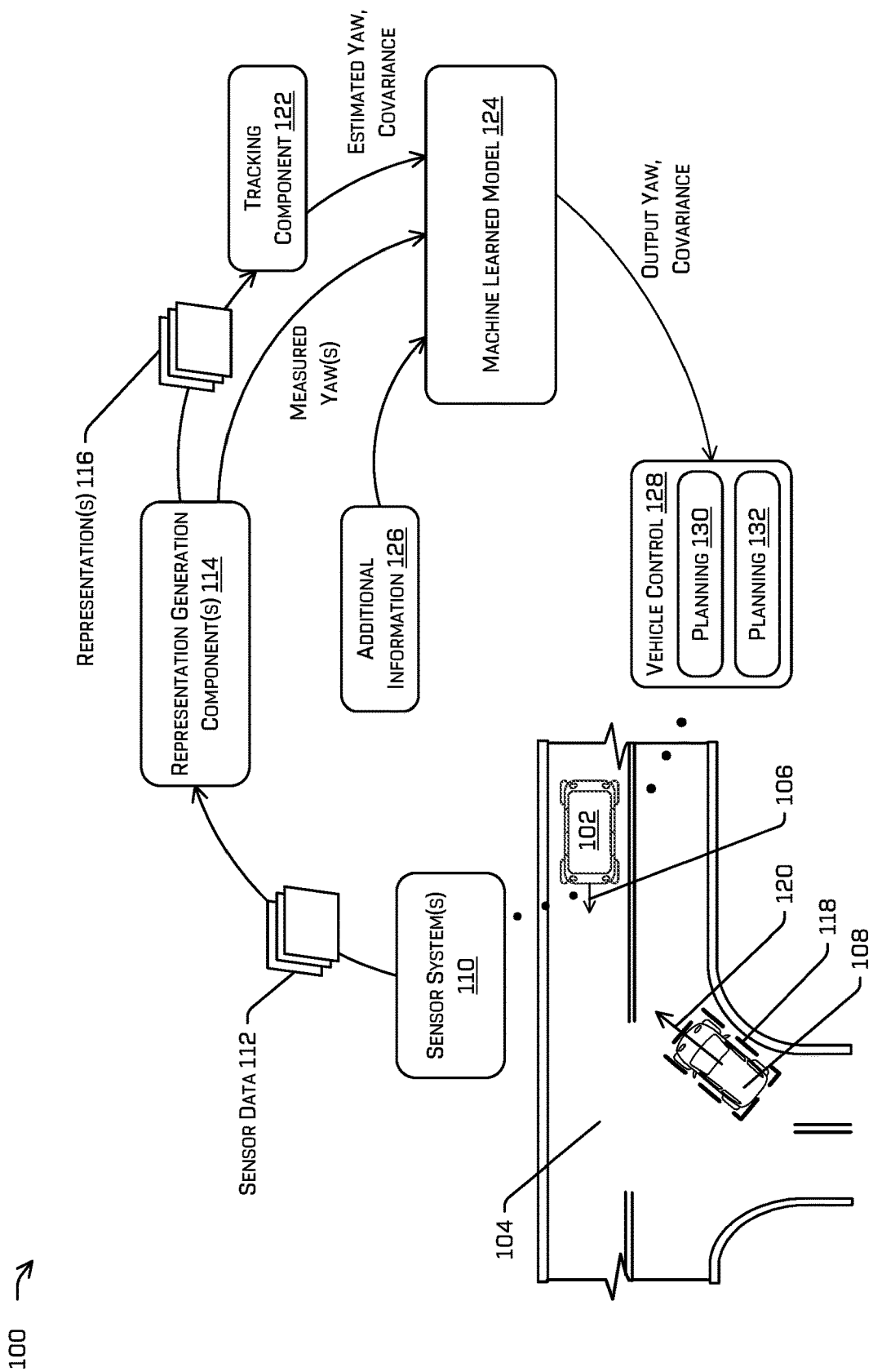
FIG. 1 is a schematic diagram illustrating an example implementation of determining a yaw using a trained model, according to aspects of this disclosure.

This disclosure is directed to training a model with machine learning and using the trained model to output a yaw angle that represents a heading of an object in an environment. For example, a system, such as an autonomous vehicle, may implement various techniques that independently (or in cooperation) capture and/or process sensor data of an environment to generate multiple representations, e.g., bounding boxes, for objects in the environment. The techniques described herein can utilize a machine learned model to determine an output yaw for such objects, based at least in part on the multiple representations.

In examples, techniques described herein can generate many representations, e.g., bounding boxes, for a same object. Such representations may be determined using different techniques and/or based on different sensor data and, thus, may include variations in size, shape, orientation, position, confidence level, etc. In some examples, techniques described herein can generate an estimated representation from the multiple representations. In at least some examples, the estimation can be based at least in part on a filtering algorithm, such as a Bayesian filter. The Bayesian filter can determine a single representation that is based at least in part on the multiple representations generated from sensor data and, in some instances, based at least in part on a previous orientation of the object.

In some examples, techniques described herein can use a machine learned model to determine an output yaw for a detected object. More specifically, the techniques described herein can include inputting estimated representations, e.g., determined using the Bayesian filter as discussed above, as well as the representations used to determine the estimated representation and/or additional data into the machine learned model to generate the output yaw. The output yaw may then be used as a predicted yaw for the detected object. The use of the trained model is in contrast to some conventional systems that use the estimated representation described above, e.g., determined using the Bayesian filter, to determine a state, including a yaw, for detected objects. The estimated representation may include an assumed linearization, which results in the loss of some data, e.g., by virtue of the parameterization of the linear estimation. Here, the machine learned model may calculate the output yaw based on the estimated representation as well as based on data explicitly and/or implicitly used to determine the estimated representation. As a result, the machine learned model may be more accurate, e.g., by virtue of reintroducing errors minimized in the estimation.

In some examples, the machine learned model can be a predictive model. For instance, the machine learned model can receive multiple iterations or frames of sensor data, representations from the sensor data, and/or estimates based on those representations to determine the output yaw, e.g., as a predicted, or current, yaw. In examples, relying on multiple frames can reduce errors from anomalous returns, anomalous representations generated from sensor data, and/or the like.

The machine learned model can be parameterized using a number of features. As noted above, the machine learned model can receive as inputs measured representations, e.g., generated from sensor data, as well as estimated representations based at least in part on the measured representations. In at least some examples, additional inputs to the machine learned model can include additional information about the detected object. By way of non-limiting example, such information can include extents of the object, a center point or other point representative of the object, a velocity of the objects, a position of the object, an orientation of the object, a classification of the object, a distance of the object from the vehicle, or the like. Also in examples, additional inputs can include information about the vehicle, such as the velocity of the vehicle, and/or information about the environment. Information about the environment can include information about the road surface, attributes of portions of the road surface, e.g., a yaw of the road segment with which the detected object is associated, and/or other information.

In techniques described herein, the machine learned model may be used during runtime of an autonomous vehicle or other system to generate accurate object tracks. For example, the model may select or generate the most appropriate predicted yaw for a detected object. The predicted yaw may be associated with a bounding box, for example, and may be used to track an object (e.g., update a state of an object tracker), generate a trajectory, or otherwise control the vehicle. By training and using such model, the techniques discussed herein may more accurately identify a heading of an object, e.g., in comparison to previous techniques. Accordingly, techniques described herein may allow an object to be represented and/or tracked with greater accuracy, in comparison to previous techniques. When used in the context of an autonomous vehicle, this may ultimately increase the safety of passengers and/or individuals around the autonomous vehicle.

While this disclosure uses an autonomous vehicle in examples, techniques described herein are not limited application in autonomous vehicles. For example, any sensor-based and/or mapping system in which objects are identified and represented may benefit from the techniques described. By way of non-limiting example, techniques described herein may be used on aircrafts, e.g., to generate representations of objects in an airspace or on the ground. Moreover, non-autonomous vehicles could also benefit from techniques described herein, e.g., for collision detection and/or avoidance systems. The techniques described herein may also be applicable to non-vehicle applications. By way of non-limiting example, techniques and implementations described herein can be implemented in any system, including non-vehicular systems, that maps objects.

FIGS. 1-6 provide additional details associated with the techniques described herein.

FIG. 1 is a schematic diagram illustrating an example implementation of using a trained model to determine attributes of an object. More specifically, FIG. 1 illustrates an example in which a trained model is used to output a yaw of an object. In more detail, FIG. 1 illustrates an example environment 100 in which a vehicle 102 is operating. In the illustrated example, the vehicle 102 is driving on a road 104 in the environment 100, along a trajectory 106. However, in other examples the vehicle 102 may be stationary and/or parked in the environment 100. In the example, the road 104 includes a number of driving lanes meeting at an intersection or junction. The road 104 is for example only; techniques described herein are applicable to other lane configurations and/or other types of driving surfaces, e.g., parking lots, private roads, driveways, or the like.

The vehicle 102 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 102 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 102 may be any configuration of vehicle, such as, for example, a van, a sport utility vehicle, a cross-over vehicle, a sedan, a truck, a bus, an agricultural vehicle, and/or a construction vehicle. The vehicle 102 is powered by one or more internal combustion engines, one or more electric motors, hydrogen power, any combination thereof, and/or any other suitable power source(s). Although the vehicle 102 is illustrated has having four wheels, the systems and methods described herein can be incorporated into vehicles having fewer or a greater number of wheels, tires, and/or tracks. The vehicle 102 can have four-wheel steering and can operate generally with equal performance characteristics in all directions. For instance, the vehicle 102 may be configured such that a first end of the vehicle 102 is the front end of the vehicle 102, and an opposite, second end of the vehicle 102 is the rear end when traveling in a first direction, and such that the first end becomes the rear end of the vehicle 102 and the second end of the vehicle 102 becomes the front end of the vehicle 102 when traveling in the opposite direction. Stated differently, the vehicle 102 may be a bi-directional vehicle capable of travelling forward in either of opposite directions. These example characteristics may facilitate greater maneuverability, for example, in small spaces or crowded environments, such as parking lots and/or urban areas.

In the scenario illustrated in FIG. 1, an additional vehicle 108 also is traveling on the road 104. In the illustrated example, the additional vehicle 108 is executing a right-hand turn into a lane adjacent to the lane in which the vehicle 102 is travelling. This illustrated scenario is for example only. For instance, although FIG. 1 illustrates only the single additional vehicle 108 more additional vehicles and/or other entities may also or alternatively be traveling on the road 104. Other entities can include, but are not limited to, buses, bicyclists, pedestrians, motorcyclists, animals, or the like. Such entities may be traveling on the road 104 and/or otherwise be present in the environment 100 (including along a side of the road 104). Moreover, such entities may be travelling in different directions than the additional vehicle 108 illustrated.

The vehicle 102 collects data as it travels through the environment 100. For example, the vehicle 102 includes one or more sensor systems 110, which can include, for example, one or more LiDAR sensors, RADAR sensors, SONAR sensors, time-of-flight sensors, image sensors, audio sensors, infrared sensors, location sensors, etc., or any combination thereof. The sensor system(s) 110 are disposed to capture sensor data 112 associated with the environment. For example, the sensor data may be processed by a vehicle control system or other processing system to identify and/or classify data associated with objects in the environment 100, such as the additional vehicle 108. In addition to identifying and/or classifying the data associated with the additional vehicle 108, the vehicle control system may also identify and/or classify additional objects, e.g., trees, vehicles, pedestrians, buildings, road surfaces, signage, barriers, road markings, or the like. In specific implementations of this disclosure, the sensor data 110 may be processed by the vehicle control system to identify portions of the data that are associated with dynamic objects in the environment 100, such as the additional vehicle 108.

As noted above, systems of the vehicle 102 use the sensor data 112 to sense objects in the environment 100 and/or to determine attributes of those objects. FIG. 1 illustrates that the sensor data 112 is received by one or more representation generation components 114. For example, the representation generation component(s) 114 include functionality to generate one or more representations 116 of objects from the sensor data 112. The representation(s) 116 can include a variety of information about the represented object, including but not limited to a velocity of the object, a center of the object, extents of the object, a position of the object, an orientation of the object, or the like. By way of non-limiting example, the representation(s) 116 can include one or more bounding boxes, e.g., two- or three-dimensional shapes, representative of the state of the sensed object. FIG. 1 illustrates a bounding box 118 associated with the additional vehicle 108 as an example visualization of one of the representation(s) 116. In some examples, the bounding box 118 may represent a spatial location, orientation, and/or size (e.g., extents) of an object. For example, a bounding box may be a representation of an object defined by eight corners (e.g., a cuboid) and having a position, orientation, length, width, and/or height. In examples, a bounding box may be a minimum volume cuboid which encompasses an object. In some examples, a bounding box is a three-dimensional box, while in other examples a bounding box is a two-dimensional box. In some examples, the bounding box may comprise 6 degrees of freedom (e.g., x, y, z, yaw, pitch, roll). In examples, an orientation of a bounding box may include yaw, pitch, and/or roll. In examples, a bounding box may be generated by representing sensor data in a voxel space and determining a volume of space in the voxel space associated with voxels that have object identifiers. An object identifier may indicate that a voxel includes data that represents at least a portion of an object. In other examples, a bounding box may be generated in other manners.

In the illustration, the direction of travel of the bounding box 118 is illustrated using an arrow 120. The direction indicated by the arrow 120 may be representative of the yaw of the additional vehicle 108. For instance, a yaw angle may be the angle between the direction indicated by the arrow 120 and some reference direction, e.g., an x-axis in a frame of reference centered at the vehicle 102. While the bounding box 118 and the arrow 120 are illustrated two-dimensionally, as noted above, the representation(s) 116 may also or alternatively include three-dimension information. In aspects of this disclosure, the representation generation component(s) 114 determine, as part of the representation(s) 116, one or more measured yaw(s).

FIG. 1 also illustrates a tracking component 122. The tracking component 122 receives the representation(s) 116 and/or one or more existing tracks to track an object, such as the additional vehicle 108. Among other functionality, the tracking component 122 may generate updated bounding boxes, e.g., to update a state of the tracked object. In some instances, the tracking component 122 may smooth a transition from a previously designated bounding box to a newly designated bounding box (e.g., so that an object track is smooth, which may more accurately reflect how an object actually traveled). In examples, the tracking component 122 may implement a Bayesian filter, e.g., a Kalman filter and/or Extended Kalman filter (EKF), to smooth a transition between states. In particular, the Bayesian filter may process a previously designated bounding box and one or more newly designated bounding boxes, such as those contained in the representation(s) 116 to determine a smoothed bounding box. As noted above, the bounding box can include information including, but not limited to, a position, an orientation, extents, a velocity, or the like. In aspects of this disclosure, the bounding box can include a yaw angle. Accordingly, in the context of FIG. 1, the tracking component 122 can update a previous state of the additional vehicle 118 based at least in part on a prior instance of the bounding box 118 and the representation(s) 116, e.g., by generating an updated and smoothed next iteration of the bounding box 118 (including a yaw angle measurement). The tracking component 122 can update a track by adding this next iteration of the bounding box 118 to the track. Stated differently, in some conventional systems, the tracking component 122 can receive the representation(s) 116, which are determined from measured data, and output an estimation of the state that is used as the next iteration.

In contrast to those conventional systems, information generated by the tracking component 122 is further processed at a machine learning model 124. In this example, the machine learning model 124 receives as inputs the estimated yaw determined by the tracking component 122 and, in some examples, a covariance associated therewith. As illustrated, the machine learned model 124 also receives one or more measured yaws determined by the representation generation component(s) 114 and/or additional information 126. Although detailed further herein, the additional information 126 can include any number of features. The additional information 126 can include information derived from the sensor data 112, e.g., by the representation generation component(s) 114 or otherwise. By way of non-limiting example, the additional information 126 can include a velocity of the vehicle 102, a velocity of the object (e.g., the additional vehicle 108), a classification of the object (e.g., vehicle, pedestrian, bus, etc.), extents of the object, and/or a position of the object (e.g., relative to the vehicle 102). The additional information 126 can also include information or data that may not be used by the representation generation component(s) 114. Without limitation, the additional information 126 can include map information, such as information about a yaw of the road or road segment associated with the object (e.g., the road segment on which the additional vehicle 108 is travelling). Thus, the machine learned model 124 receives a number of inputs relating to yaw and/or other attributes of the vehicle 102, the environment 100 and/or an object to be tracked and generates an output yaw. As illustrated, the output yaw may have an accompanying covariance.

The machine learned model 124 may be a learned motion model that predicts the output yaw from a plurality of input data types. As noted above, the machine learned model 124 can receive information from the tracking component 122, from the representation generation component(s) 114, and/or from other sources. In some examples, the machine learned model 124 can include a plurality of connected layers, e.g., fully connected layers. Moreover, a cost function associated with the machine learned model can be a quadratic regression, a cross entropy loss, and/or the like. In some instances, a final layer of the machine learned model 124 may be a classification layer that determines the output yaw as belonging to one of a plurality of bins or ranges of yaw angles. In one example, the output yaw may correspond to one of sixteen bins (e.g., each being associated with 22.5 degrees), although more or fewer bins can be used. Stated differently, the machine learned model 124 may have a finite resolution. As noted, the machine learned model 124 can be predictive, e.g., using multiple frames or instances of data to determine a current yaw of a detected object.

In the illustrated example, the output yaw and/or the associated covariance from the machine learned model 124 is/are received at a vehicle control system 128. The vehicle control system 128 uses the output yaw to control the vehicle 102. For example, and as illustrated, the vehicle control system 128 can include a prediction component 130 and a planning component 132. Generally, the prediction component 130 can generate predicted trajectories of detected objects, such as the additional vehicle 108. For example, the prediction component 130 can generate one or more predicted trajectories for vehicles, pedestrians, animals, and the like within a threshold distance from the vehicle 102. In some instances, the prediction component 130 can measure a trace of an object and generate a trajectory for the object. In some instances, the prediction component 130 may cooperate with the tracking component 122 to track objects as they progress through the environment 100. In general, the planning component 132 can determine a path for the vehicle 102 to follow to traverse through an environment. For example, the planning component 132 can determine various routes and trajectories and various levels of detail.

Although not illustrated in FIG. 1, the output yaw and/or covariance may also be received at the tracking component 122. For instance, the tracking component 122 may use the output yaw in the most-recent iteration in a track associated with the additional vehicle 108. Such functioning may be in contrast to conventional tracking components, which may use the estimated yaw in the next track instance. For example, the tracking component 122, which may include a Bayesian filter as discussed above, generates an estimated yaw using a linear estimation. Using such an estimation may result in the loss of some data, e.g., by virtue of the parameterization of the linear estimation. However, because the machine learned model 124 calculates the output yaw based on the estimated yaw from the tracking component as well as based on data explicitly and/or implicitly used by the tracking component 122, some of the data lost by the tracking component 122 is retained (or reintroduced) into the machine learned model 124. Accordingly, in some examples, the covariance associated with the output yaw may be higher than the covariance associated with the estimated yaw. That is, the result from the machine learned model 124 may have a lower confidence than the estimated yaw, but may be more accurate, by virtue of not minimizing upstream errors.

The machine learned model 126 may be a predictive model, e.g., that determines the output yaw based on multiple iterations of the measured yaw(s), estimated yaw, and the additional information 126. For example, the representation generation component(s) 114 may be configured to generate the representation(s) 116 at a predetermined frequency and the tracking component 122 may generate the estimated yaw at a corresponding frequency. The machine learned model 124 may generate the output yaw at a lower frequency, e.g., based on multiple instances of the estimated yaw and the measured yaw(s). In one non-limiting example, the machine learned model 124 can generate the output yaw as a predicted yaw based on from one to ten instances, e.g., frames. As will be appreciated, more frames may provide a better output, e.g., by minimizing anomalous or otherwise unreliable data and/or representations, whereas too many frames can result in considering stale or otherwise latent data. Accordingly, the amount of data put into the machine learned model 124 may be varied. Similarly, as discussed above in connection with the additional information 126, the type of data put into the machine learned model 124 can vary.

Figure 2:
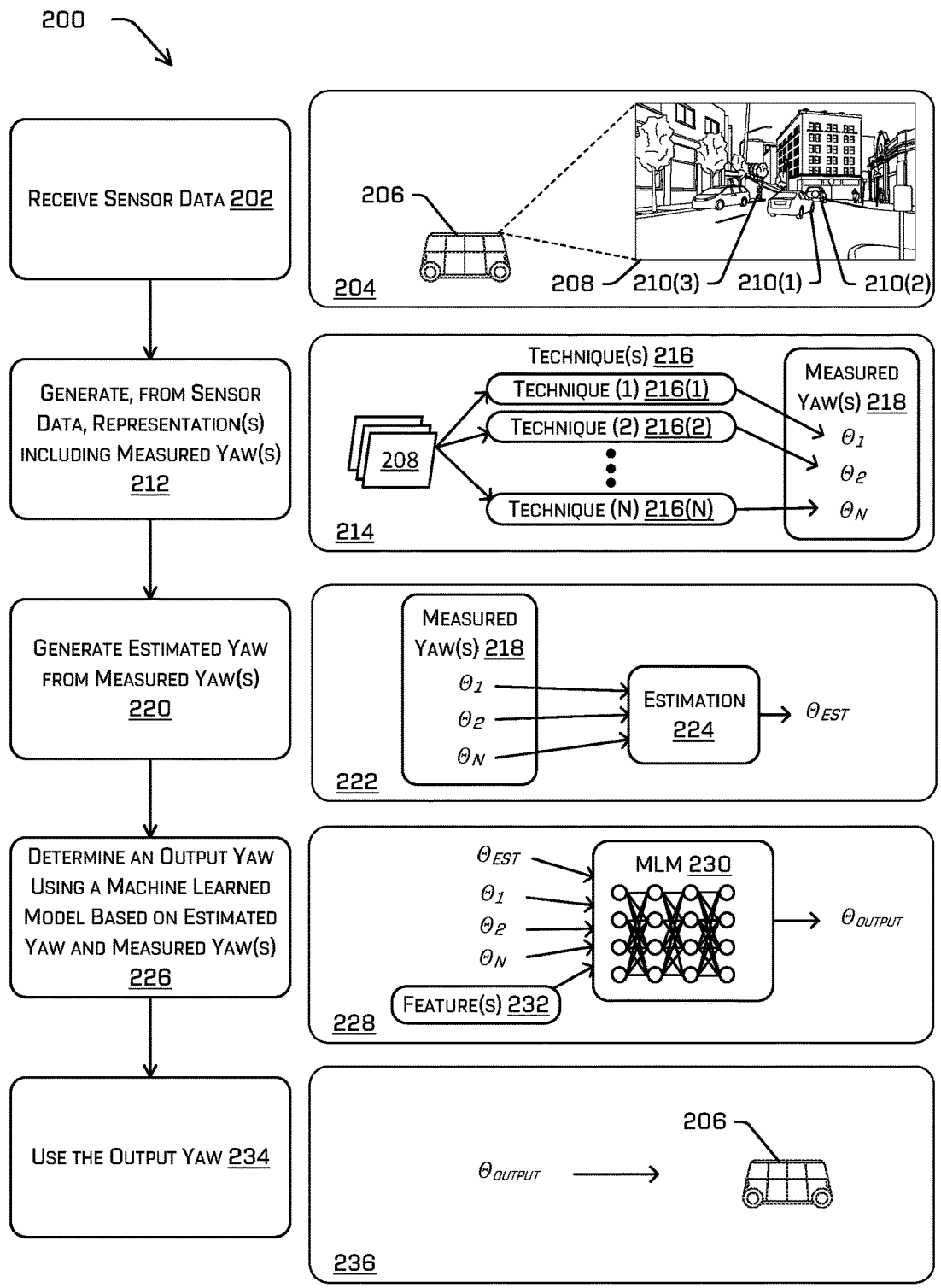
FIG. 2 includes textual and visual flowcharts to illustrate an example method of determining yaw using a trained model, according to aspects of this disclosure.

FIG. 2 includes textual and pictorial flow diagrams of an example process 200 for using a machine learned model to determine an output yaw. In some examples, the process 200 can be executed in the environment 100 using the components illustrated in and described in connection with FIG. 1. However, the process 200 is not limited to being performed in the environment 100, and the components shown in FIG. 1 are not limited to performing the process 200.

At an operation 202, the process 200 includes receiving sensor data. As noted above, implementations described herein can determine a yaw based on a number of representations generated from sensor data. In an example 204 accompanying the operation 202, a vehicle 206 has an imaging device that generates an image 208 of an environment around the vehicle 206. In the example, the image 208 includes data about a portion of the environment that includes a number of objects. For example, a first object 210(1) may be a first vehicle behind which the vehicle 206 is travelling, a second object 210(2) may be a second vehicle in front of the first vehicle, and a third object 210(3) may be a pedestrian waiting to cross a street. Other objects, including additional vehicles, additional pedestrians and/or additional static and dynamic objects also are present in the image 208. In the example 204, the vehicle 206 may be the vehicle 102 or a different vehicle. The image 208 is an example of sensor data generated by a sensor system on the vehicle 206. However, this disclosure is not limited to imaging sensors and image data, other sensor modalities, including but not limited to LiDAR sensors, radar sensors, time of flight sensors, thermal sensors, or the like also are contemplated.

At an operation 212, the process 200 includes generating, from the sensor data, one or more representations including one or more measured yaws. For example, the operation 212 can include generating one or more state representations, e.g., bounding boxes, from the sensor data received at the operation 202 for individual of the objects 210. The state representations can include two- and/or three-dimensional information, which may include extents, position information, orientation information, or the like of detected objects from the sensor data 208. Specifically, the orientation information may be determined as a yaw angle, e.g., in a two-dimensional plane parallel to horizontal (or the driving surface). In an example 214 accompanying the operation 212, one or more technique(s) 216 are illustrated as using the sensor data 208 to determine one or more measured yaw(s) 218. Without limitation, the technique(s) 216 can include one or more of a top-down technique, a ground-based technique, a blob-based or clustering technique, a region of interest-based technique, and/or a pose-based technique. In one example, a top-down technique may include a technique discussed in U.S. patent application Ser. No. 15/963,833, filed Apr. 26, 2018 and entitled "Data Segmentation Using Masks," the entirety of which hereby is incorporated by reference. In another example, the technique(s) 216 can include a ground-based technique which may include a technique discussed in U.S. patent application Ser. No. 15/622,905, filed Jun. 14, 2017 and entitled "Voxel Based Ground Plane Estimation and Object Segmentation," the entirety of which hereby is incorporated by reference.

In the example 214, the technique(s) 216 can include one or more of a first technique 216(1), a second technique 216(2), and/or at least one additional technique 216(N). As illustrated, the first technique 216(1) generates a first measured yaw $\theta_1$, the second technique 216(2) generates a second measured yaw $\theta_2$, and the additional technique 216(N) generates an additional measured yaw $\theta_N$. Because each of the measured yaw(s) 218 is determined using a different technique (which can use different data and/or different data processing techniques), each of the measured yaw(s) 218 may have different values, e.g., even though they relate to the same detected object. Thus, in this example, the technique(s) 216 can generate multiple yaw measurements for each of the first object 210(1), the second object 210(2), and the third object 210(3). Moreover, and as discussed above, the technique(s) 216 can generate information in addition to the measured yaw(s) 218. Without limitation, such additional information can include extents of the detected object, a location of the object, e.g., relative to the vehicle 206, a distance of the object from the vehicle 206, segmentation information associated with the object, a velocity of the object, and/or other information.

At an operation 220, the process 200 includes generating an estimated yaw from the measured yaw(s). For example, the process 200 can implement estimation or filtering processes to determine an estimated yaw for each detected object 210, using the one or more measured yaws 218 associated with that respective object. An example 222 accompanying the operation 220 illustrates an estimation component 224 as receiving the measured yaw(s) 218 and outputting a single estimated yaw $\theta_{EST}$. In some examples, the tracking component 224 can use a Bayesian filtering technique, e.g., a Kalman filter, an extended Kalman filter, to determine the estimated yaw $\theta_{EST}$. In some examples, the estimation component 224 can be associated with or including functionality of the tracking component 122, described above.

At an operation 226, the process 200 includes determining an output yaw using a machine learned model based on the estimated yaw and the measured yaw(s). In an example 228 accompanying the operation 226 the estimated yaw $\theta_{EST}$ and the measured yaw(s) 218 are input into a machine learned model (MLM) 230, and the MLM 230 generates an output yaw $\theta_{OUTPUT}$. As also illustrated in the example 228, one or more features 232 are input into the MLM 230. In examples, the feature(s) 232 may be additional information used by the MLM 230 to determine the output yaw $\theta_{OUTPUT}$ for individual of the objects 210. In examples, the MLM 230 can be the machine learned model 124 and the feature(s) 232 can be the additional information 126. Without limitation, the feature(s) 232 can include information determined by the technique(s) 206, including examples discussed above. Also in examples, the feature(s) 232 can include information other than determined by the technique(s) and/or from sources other than or in addition to the sensor data 208. Such information can include information about the environment, such as map, weather data, road surface data, and/or the like. In one not limiting example, the feature(s) 232 can include information about a road segment closest to a detected object and/or a yaw of that road segment.

At an operation 234, the process 200 includes using the output yaw 234. For examples, and as graphically illustrated in an example 236 accompanying the operation 234, the output yaw $\theta_{OUTPUT}$ can be used to control the vehicle 206. For instance, the output yaw $\theta_{OUTPUT}$ can be used by a perception system associated with the vehicle 206 to determine tracks of the objects 210 and/or by a planning system to determine a trajectory for the vehicle 206 to navigate relative to the objects 210. In examples, the output yaw can be used to control aspects of the vehicle 206 in lieu of the estimated yaw BEST. By way of non-limiting example, the output yaw $\theta_{OUTPUT}$ can be used by a tracking component, e.g., as a last yaw of the associated object.

Figure 3:
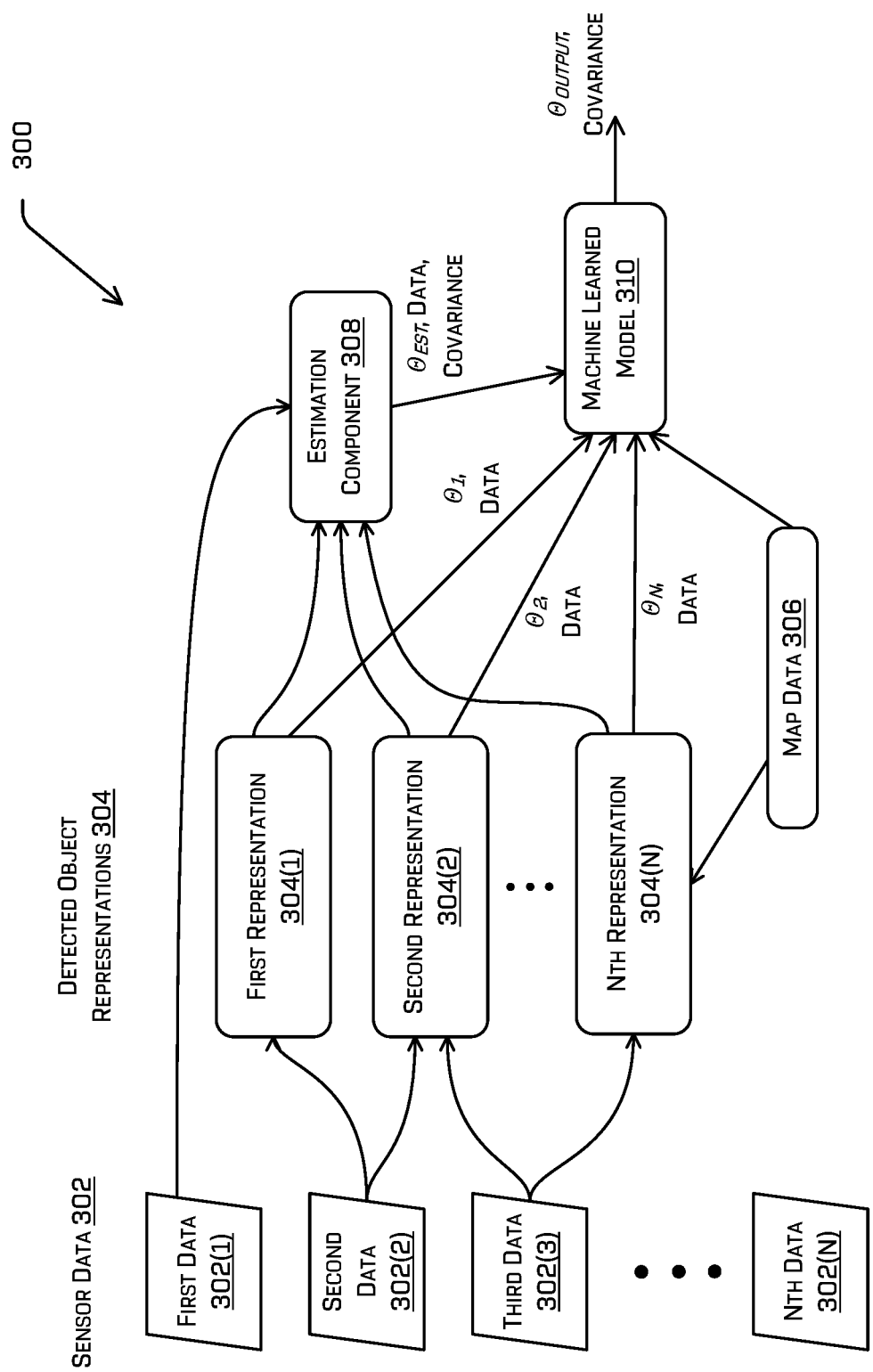
FIG. 3 illustrates a block diagram of an example system for implementing a trained model to output yaw, according to aspects of this disclosure.

FIG. 3 is a schematic diagram illustrating aspects of a yaw determination system 300 according to aspects of this disclosure. For example, the system 300 can be used to implement aspects of the process 200.

In more detail, the system 300 includes several instances of sensor data 302. The sensor data 302 is illustrated as including first data 302(1), second data 302(2), third data 302(3), . . . and Nth data 302(N). In examples, instances of the sensor data 302 can be generated by respective sensors (not shown). For example, the first data 302(1) can be generated by a first sensor, the second data 302(2) can be generated by a second sensor, and so forth. The first sensor may be the same modality as or a different modality than the second sensor. By way of non-limiting example, the first data 302(1) may be radar data, the second data 302(2) may be image data, and the third data 302(3) may be LiDAR data. Again, the sensor data 302 can include additional instances of any or all of these data types and/or different data types.

The system 300 also includes several detected object representations 304. The detected object representations 304 are illustrated as including a first representation 304(1), a second representation 304(2), . . . and an Nth representation 304(N). In examples, instances of the detected object representations 304 can including bounding boxes determined from different instances and/or types of the sensor data 302, e.g., using various techniques. Continuing the example above in which the second data 302(2) is image data and the third data 302(3) is LiDAR data, the first representation 304(1) can be determined based solely on image data, whereas the second representation is determined from both image data and LiDAR data. In some examples, the detected object representations may also be based on information in addition to the sensor data 302. For example, the Nth representation is indicated as being generated from the third data 302(3) as well as from map data 306. Some techniques can include generating an object representation based on both LiDAR data and road information. The map data 306 is for example only, as other types of data may be used by different techniques to determine the detected object representations 304. In examples, each of the illustrated first representation 304(1), second representation 304(2), and the Nth representation 304(N) may be generated from the same, completely different, or overlapping data types.

As noted above, the detected object representations 304 can include bounding boxes in some implementations. A bounding box may be characterized by one or more of a center, lateral extents, longitudinal extents, vertical extents, an orientation, e.g., yaw angle, a velocity, a yaw rate, or other parameters. In the system 300, one or more of the characteristics associated with the detected object representations 304 are provided to an estimation component 308. Like the estimation component 224, the estimation component 308 can include functionality to determine a single, estimated representation from the plurality of input representations. The estimated representation includes an estimated yaw and, in some instances, additional data (e.g., position, orientation, pose) and/or a covariance associated with the estimated representation. For example, the estimation component 308 can include one or more filters, such as Bayesian filters, to determine the estimated representation from the detected object representations 304. As illustrated, the estimation component 308 can also consider information in addition to the detected object representations 304. For example, the estimation component 308 is indicated as receiving the first data 302(2). In example, the first data 302(2) can be processed prior to being received at the estimation component 308, e.g., by one or more additional data processing components not illustrated. As will be understood, the first data 302(2) is for example only, generally to represent that the estimation component 308 can generate an estimated representation (including the estimated yaw) from data in addition to the detected object representations 304.

The system 300 also includes a machine learned model 310. The machine learned model 310 can receive information associated with the object detection representations 304 (e.g., measured yaws and additional data), information associated with the estimated representation (e.g., the estimated yaw, additional estimated data, and/or a covariance), the map data 306, and/or other information. The machine learned model 310 can generate an output yaw and, in some instances, a covariance associated with the output yaw. In examples, the machine learned model 310 can be the same as the machine learned model 124 and/or the machine learned model 230. The machine learned model 310 can determine the output yaw based on a number of inputs or features, including but not limited to, a velocity of the object, a velocity of the vehicle, a distance of the object to the vehicle, a type or classification of the object, road information associated with a road segment associated with the object, such as a yaw of the road segment, the covariance associated with the estimated yaw, a confidence associated with the detected object representations 304, and/or other features.

Figure 5:
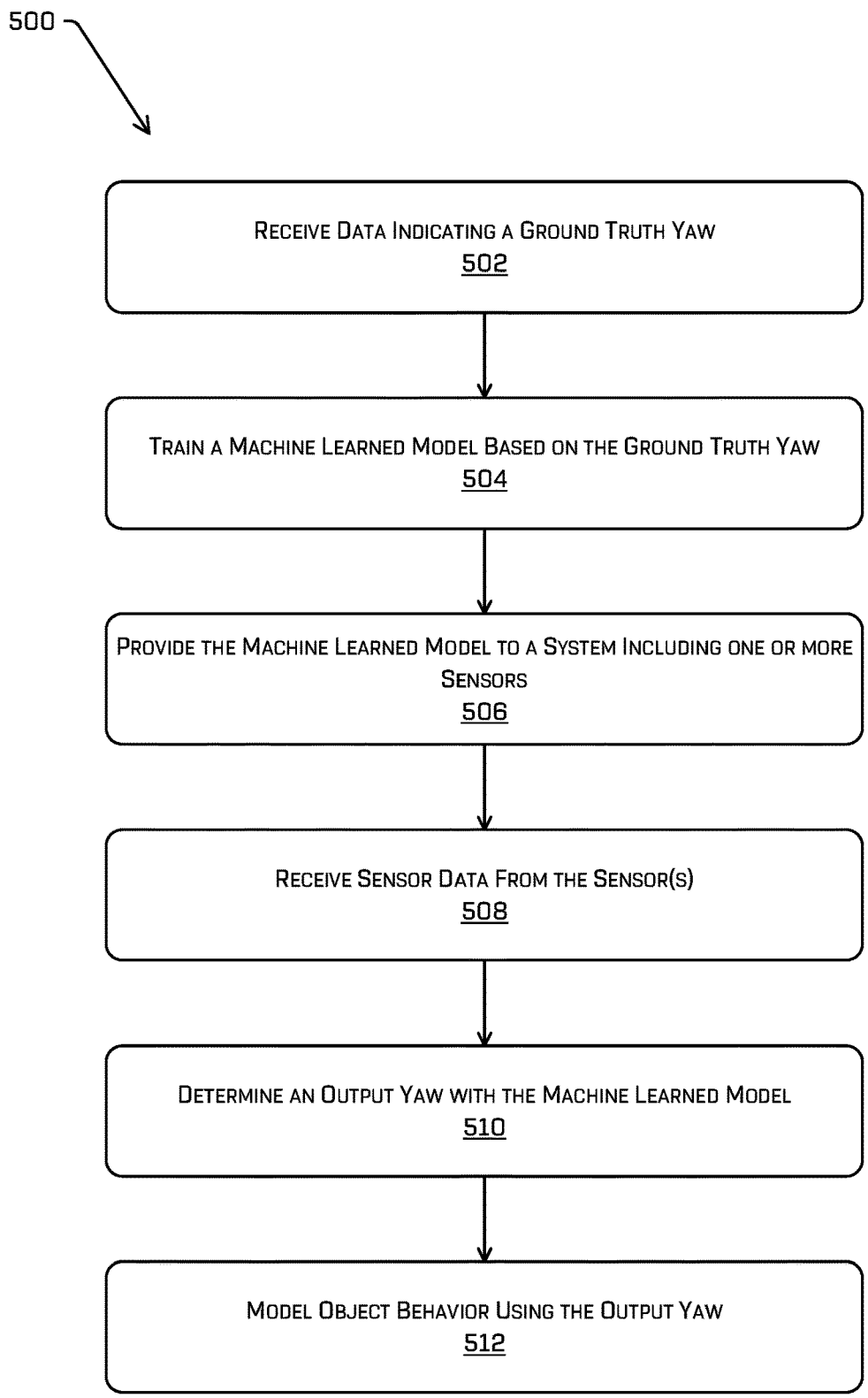
FIG. 5 is a flowchart illustrating an example method to train and use a machine learned model for outputting yaw, according to aspects of this disclosure.
Figure 6:
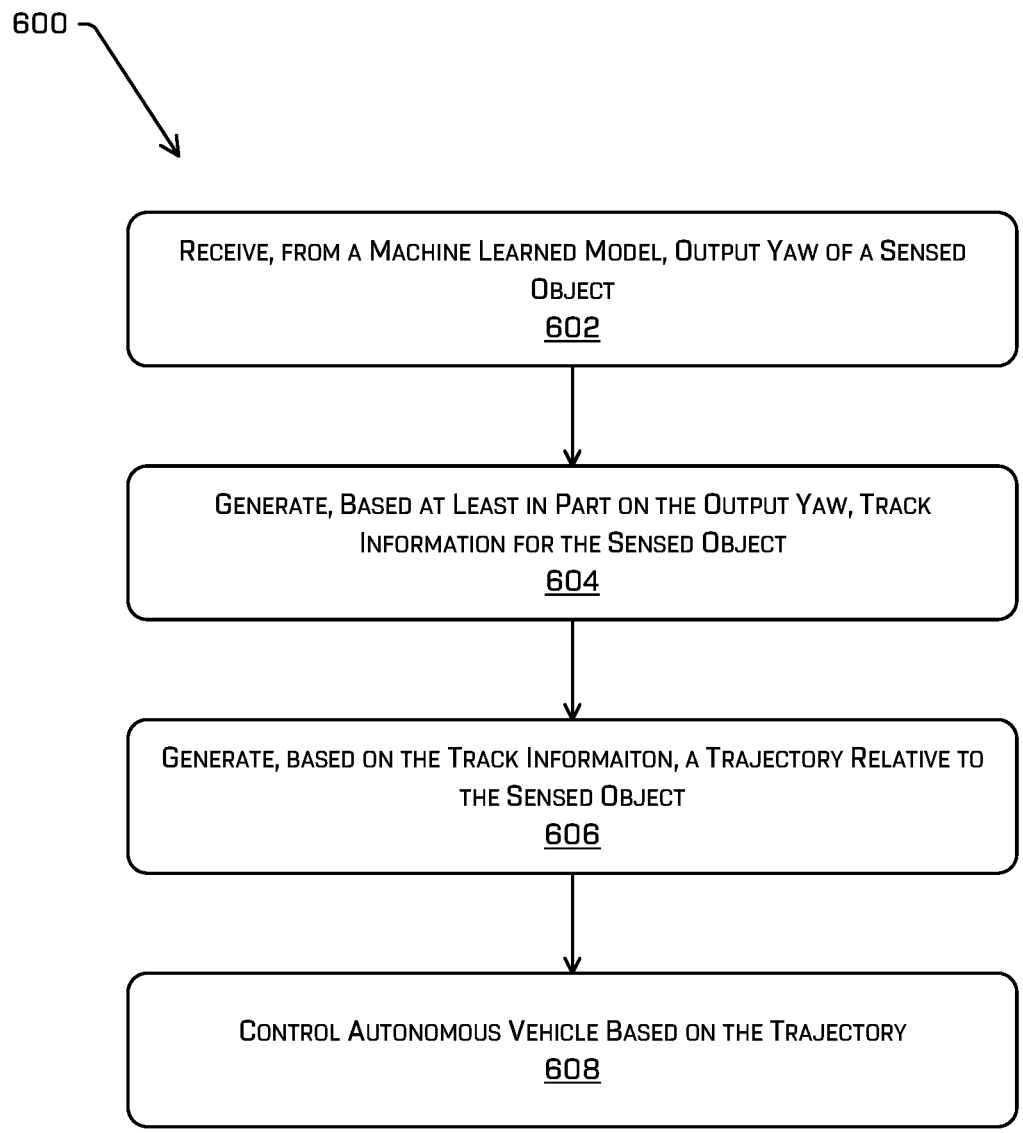
FIG. 6 illustrates an example method for controlling a vehicle relative to objects tracked according to techniques described herein.

Aspects of FIG. 2 (and of FIGS. 5 and 6, below) are described with reference to components illustrated in FIG. 1, in the environment 100 of FIG. 1 by way of example. However, the examples illustrated and described with reference to FIGS. 2, 5, and 6 are not limited to being performed in the environment 100 or using the components of FIG. 1. For example, some or all of the examples described with reference to FIGS. 2, 3, 5, and 6 can be performed by one or more components of FIG. 4, as described herein, or by one or more other systems or components.

Figure 4:
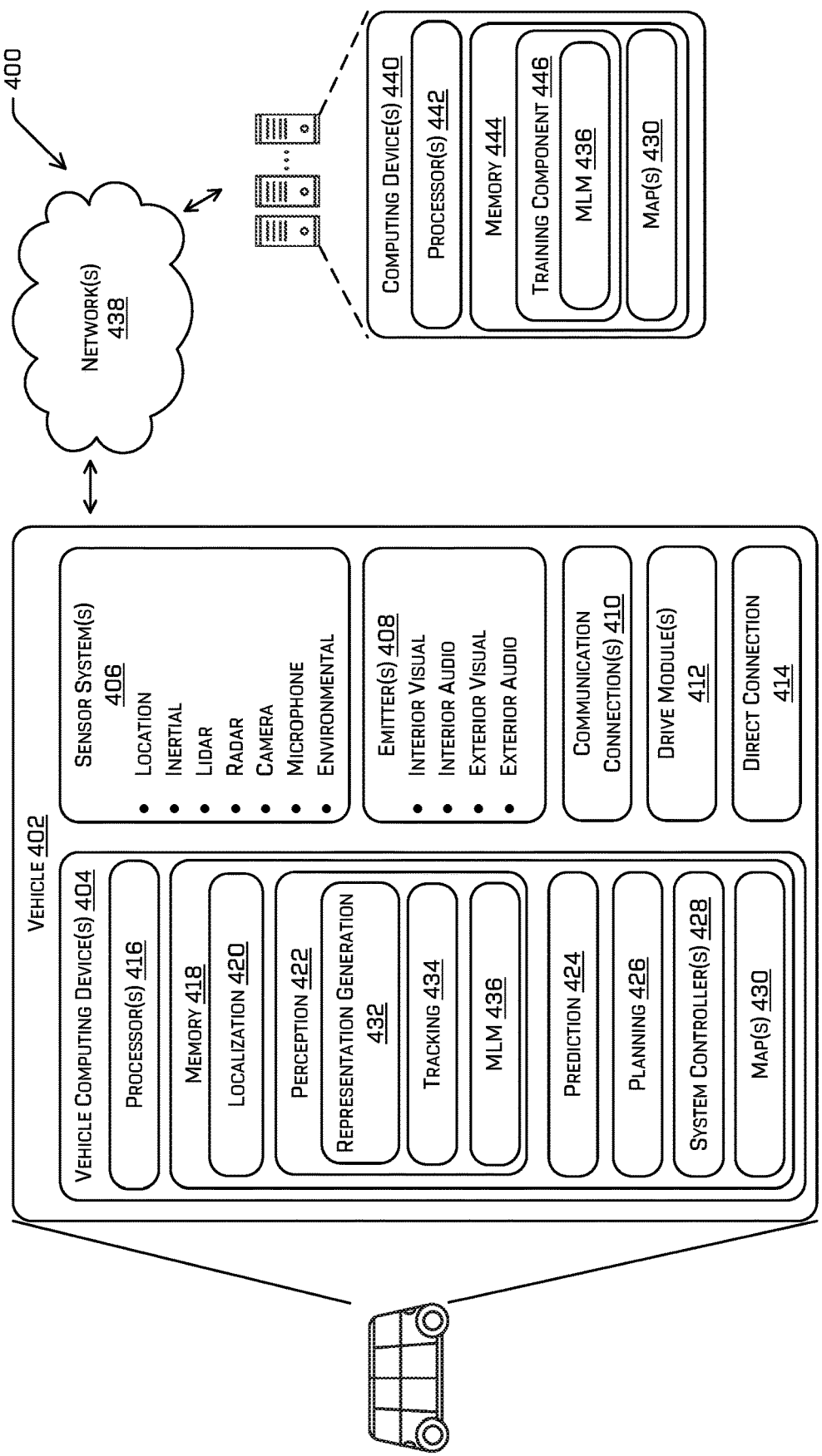
FIG. 4 depicts a block diagram of an example system for implementing the techniques described herein.

FIG. 4 depicts a block diagram of an example system 400 for implementing the techniques described herein. In at least one example, the system 400 can include a vehicle 402, which may be the same as or different from the vehicle 102 shown in FIG. 1 and/or the vehicle 204 shown in FIG. 2. The vehicle 402 can include one or more vehicle computing devices 404, one or more sensor systems 406, one or more emitters 408, one or more communication connections 410, one or more drive modules 412, and at least one direct connection 414.

The vehicle computing device(s) 404 also include one or more processors 416 and memory 418 communicatively coupled to the one or more processors 416. In the illustrated example, the vehicle 402 is an autonomous vehicle. However, the vehicle 402 could be any other type of vehicle, or any other system having at least one sensor (e.g., a camera enabled smartphone). In the illustrated example, the memory 418 of the vehicle computing device 404 stores a localization component 420, a perception component 422, a prediction component 424, a planning component 426, one or more system controller(s) 428, and one or more maps 430. Moreover, the perception component 422 includes a representation generation component 432, a tracking component 434, and a machine learned model (MLM) 436. Though depicted in FIG. 4 as residing in the memory 418 for illustrative purposes, it is contemplated that the localization component 420, the perception component 422 (and/or components thereof), the prediction component 424, the planning component 426, the system controller(s) 428, and the map(s) 430 can additionally, or alternatively, be accessible to the vehicle 402 (e.g., stored on, or otherwise accessible by, memory remote from the vehicle 402).

In at least one example, the localization component 420 can include functionality to receive data from the sensor system(s) 406 to determine a position and/or orientation of the vehicle 402 (e.g., one or more of an x-, y-, z-position, roll, pitch, or yaw). For example, the localization component 420 can include and/or request/receive a map of an environment and can continuously determine a location and/or orientation of the autonomous vehicle within the map. In some instances, the localization component 420 can utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 can provide data to various components of the vehicle 402 to determine an initial position of the autonomous vehicle 402 for generating a trajectory.

In some instances, the perception component 422 generally includes functionality to perform object detection, segmentation, and/or classification. In some examples, the perception component 422 can provide processed sensor data that indicates a presence of an object that is proximate to the vehicle 402 and/or a classification of the object as an object type (e.g., car, pedestrian, cyclist, animal, building, tree, road surface, curb, sidewalk, unknown, etc.). In additional and/or alternative examples, the perception component 422 can provide processed sensor data that indicates one or more characteristics associated with a detected object (e.g., a tracked object) and/or the environment in which the object is positioned. In some examples, characteristics associated with the object can include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc. In some examples, the perception component 422 can use radar data to determine objects, and may receive information about reflected returns, e.g., to include/exclude sensor data, as described herein.

As illustrated, the perception component 422 includes the representation generation component 432. The representation generation component 432 can be the same as, or include functionality similar to, the representation generation component(s) 114, discussed above. Generally, the representation generation component 432 includes functionality to determine one or more representations of detected objects. For instance, the representation generation component 432 can implement one or more techniques to determine one or more bounding boxes or other representations of objects. The techniques can include different mathematical algorithms, machine learned models, or other processes to model aspects of detected objects. In examples of this disclosure, representations can include bounding boxes and/or any other information related to position, orientation, extents, pose, and/or dynamics of an object.

The perception component 422 also includes the tracking component 434. In some examples, the tracking component 434 can be substantially the same as, and/or include functionality similar to, the tracking component 122, discussed above. Generally, the tracking component 434 receives representations generated by the representation generation component 432 and determines an estimated (e.g., a single estimated) representation for a detected object. The tracking component 434 performs its operations iteratively to generate one or more existing tracks to track an object. Among other functionality, the tracking component 434 may generate updated bounding boxes, e.g., to update a state of the tracked object. In examples, the tracking component 434 may implement a Bayesian filter, e.g., a Kalman filter and/or Extended Kalman filter (EKF), to smooth a transition between states of the object, e.g., using a previous state and the representations determined by the representation generation component 432. The tracking component 434 can determine an estimated yaw and/or other attributes of a detected object.

The prediction MLM 436 generally includes functionality to determine a yaw for a detected object, as described herein. The MLM 436 can be the same as or implement functionality similar to at least one of the machine learning model 124, the MLM 230, and/or the machine learned model 230, described herein. Generally, the MLM 436 receives, as inputs, an estimated yaw from the tracking component 434 and information from the representation generation component 432 to generate an output yaw. As also described herein, the MLM 436 can be configured to determine an output yaw from several instances or frames of data and/or representations. For instance, the MLM 436 may receive as inputs representations and/or data generated at different times and/or at a relatively higher frequency. The output yaw may be provided to the prediction component 424 and/or the planning component 426, as described herein. Also in examples, the output yaw can be transmitted to the tracking component 434, e.g., to be used in a track, in some instances in lieu of the estimated yaw determined by the tracking component 434.

The MLM 436 (and/or other components of the vehicle computing device(s) 404) can include one or more models, algorithms, and/or machine learning algorithms. For example, in some instances, the components in the memory 418 (and/or memory 444, discussed below) can be implemented as one or more neural networks. By way of non-limiting example, the MLM 436 can include different models for different types of objects, e.g., different classifications, including a first model for vehicles, a second model for pedestrians, and so forth.

As described herein, an exemplary neural network is a biologically inspired algorithm which passes input data through a series of connected layers to produce an output. Each layer in a neural network can also comprise another neural network or can comprise any number of layers (whether convolutional or not). One of the layers in a neural network may be a classification layer, e.g., which may determine an output yaw as belonging to a range of output yaws. As can be understood in the context of this disclosure, a neural network can utilize machine learning, which can refer to a broad class of such algorithms in which an output is generated based on learned parameters.

The MLM 436 can also include any type of machine learning. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 4 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

In some examples, the prediction component 424 can include functionality to generate predicted trajectories of objects in an environment. For example, the prediction component 424 can generate one or more predicted trajectories for vehicles, pedestrians, animals, and the like within a threshold distance from the vehicle 402. In some instances, the prediction component 424 can measure a trace of an object and generate a trajectory for the object. In some instances, the prediction component 424 may cooperate with the tracking component 434 to track objects as they progress through the environment.

In general, the planning component 426 can determine a path for the vehicle 402 to follow to traverse through an environment. For example, the planning component 426 can determine various routes and trajectories and various levels of detail. For example, the planning component 426 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 426 can generate an instruction for guiding the autonomous vehicle along at least a portion of the route from the first location to the second location. In at least one example, the planning component 426 can determine how to guide the autonomous vehicle from a first waypoint in the sequence of waypoints to a second waypoint in the sequence of waypoints. In some examples, the instruction can be a trajectory, or a portion of a trajectory. Moreover, in some implementations, multiple trajectories can be substantially simultaneously generated (e.g., within technical tolerances) in accordance with a receding horizon technique, with one of the multiple trajectories being selected for the vehicle 402 to navigate. In some instances, the planning component 426 can generate one or more trajectories for the vehicle 402 based at least in part on sensor data, e.g., radar returns. For example, the planning component 426 may exclude returns determined to be reflected returns.

The system controller(s) 428 can be configured to control steering, propulsion, braking, safety, emitters, communication, and other systems of the vehicle 402, e.g., based on controls generated by the planning component 426 and/or based on information from the planning component 426. The system controller(s) 428 can communicate with and/or control corresponding systems of the drive module(s) 412 and/or other components of the vehicle 402.

The map(s) 430 can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In some examples, the map(s) 430 can include at least one map (e.g., images and/or a mesh). The vehicle 402 can be controlled based at least in part on the map(s) 430. That is, the map(s) 430 can be used in connection with the localization component 420, the perception component 422, the prediction component 424, and/or the planning component 426 to determine a location of the vehicle 402, identify objects in an environment, and/or generate routes and/or trajectories to navigate within an environment. Moreover, and as described herein, information from the map(s) 430 can be used as inputs into the representation generation component 432, the tracking component 434, and/or the MLM 436. By way of non-limiting example, the map(s) 430 may provide information indicative of a yaw of a road segment proximate a detected object, and such information can be a feature used by the MLM 436 in determining the output yaw.

In some examples, the map(s) 430 can be stored on one or more remote computing devices (such as one or more computing device(s) 440) accessible via one or more networks 430. In some examples, the map(s) 430 can include multiple similar maps stored based on, for example, a characteristic (e.g., type of entity, time of day, day of week, season of the year, etc.). Storing multiple of the map(s) 430 in this manner can have similar memory requirements, but increase the speed at which data in a map can be accessed.

As can be understood, the components discussed herein (e.g., the localization component 420, the perception component 422 (and its components), the prediction component 424, the planning component 426, the system controller(s) 428, and the map(s) 430) are shown and described as divided for illustrative purposes. However, the operations performed by the various components can be combined or performed in any other component.

In at least one example, the sensor system(s) 406 can include LiDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 can include multiple instances of each of these or other types of sensors. For instance, the lidar sensors can include individual lidar sensors located at the corners, front, back, sides, and/or top of the vehicle 402. As another example, the camera sensors can include multiple cameras disposed at various locations about the exterior and/or interior of the vehicle 402. As another example, the radar system can include multiple instances of the same or different radar sensors disposed at various locations about the vehicle 402. The sensor system(s) 406 can provide input to the vehicle computing device 404. Additionally or alternatively, the sensor system(s) 406 can send sensor data, via the one or more networks 438, to the computing device(s) 440 at a particular frequency, after a lapse of a predetermined period of time, in near real-time, etc.

The emitter(s) 408 can be configured to emit light and/or sound. The emitter(s) 408 in this example can include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example can also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The communication connection(s) 410 can enable communication between the vehicle 402 and one or more other local or remote computing device(s). For instance, the communication connection(s) 410 can facilitate communication with other local computing device(s) on the vehicle 402 and/or the drive module(s) 412. Also, the communication connection(s) 410 can allow the vehicle to communicate with other nearby computing device(s) (e.g., other nearby vehicles, traffic signals, etc.). The communications connection(s) 410 also enable the vehicle 402 to communicate with a remote teleoperations computing device or other remote services.

The communication connection(s) 410 can include physical and/or logical interfaces for connecting the vehicle computing device 404 to another computing device or a network, such as the network(s) 438. For example, the communication connection(s) 410 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 can include the drive module(s) 412. In some examples, the vehicle 402 can have a single drive module 412. In at least one example, the vehicle 402 may have multiple drive modules 412 with individual of the drive modules 412 positioned on opposite ends of the vehicle 402 (e.g., the front and the rear, etc.). In at least one example, the drive module(s) 412 can include one or more sensor systems to detect conditions of the drive module(s) 412 and/or the surroundings of the vehicle 402. By way of example and not limitation, the sensor system(s) associated with the drive module(s) 412 can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders can be unique to the drive module(s) 412. In some cases, the sensor system(s) on the drive module(s) 412 can overlap or supplement corresponding systems of the vehicle 402 (e.g., the sensor system(s) 406).

The drive module(s) 412 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 412 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 412. Furthermore, the drive module(s) 412 may also include one or more communication connection(s) that enable communication by the respective drive module with one or more other local or remote computing device(s).

In at least one example, the direct connection 414 can provide a physical interface to couple the drive module(s) 412 with the body of the vehicle 402. For example, the direction connection 414 can allow the transfer of energy, fluids, air, data, etc. between the drive module(s) 412 and the vehicle. In some instances, the direct connection 414 can further releasably secure the drive module(s) 412 to the body of the vehicle 402.

In at least one example, the localization component 420, the perception component 422, the prediction component 424, the planning component 426, the system controller(s) 428, and/or the map(s) 430 can process sensor data, as described above, and can send their respective outputs, over the one or more network(s) 436, to one or more computing device(s) 438. In at least one example, the localization component 420, the perception component 422, the prediction component 424, the planning component 426, the reflection recognition component 428, the system controller(s) 430, the map(s) 432, and/or the tracker 434 can send their respective outputs to the one or more computing device(s) 438 at a particular frequency, after a lapse of a predetermined period of time, in near real-time, etc.

In some examples, the vehicle 402 can send sensor data to the computing device(s) 440, e.g., via the network(s) 438. In some examples, the vehicle 402 can send raw sensor data to the computing device(s) 440. In other examples, the vehicle 402 can send processed sensor data and/or representations of sensor data (e.g., spatial grid data) to the computing device(s) 440. In some examples, the vehicle 402 can send sensor data to the computing device(s) 440 at a particular frequency, after a lapse of a predetermined period of time, in near real-time, etc. In some cases, the vehicle 402 can send sensor data (raw or processed) to the computing device(s) 4440 as one or more log files.

The computing device(s) 440 can include processor(s) 442 and the memory 444 storing a training component 446 and one or more maps 446.

The training component 446 is configured to train the MLM 436. For instance, the training component 446 can receive ground truth yaw rates associated with sensor data. For instance, the training component 446 may receive user annotated data indicating ground truth yaw rates that have been designated by one or more users. For instance, a user may view sensor data or representations of sensor data (including state data from a tracking component) through a display on a client device and provide input to associate or otherwise define a yaw angle with an object as a ground truth yaw angle (e.g., via a mouse, touch screen, or other device to draw an arrow or other directional indicator, place an arrow or other directional indicator, update an existing arrow or other directional indicator, select a range of angles (e.g., a bin or grouping), etc.). In some instances, the user or the computing device may designate an identifier for a ground truth yaw, such as an identifier that identifies a type of object with which the yaw is associated (e.g., a classification associated with the object), a unique identifier that identifies a specific object with which the yaw is associated, etc. An object may include a vehicle, person, sign, road, structure (e.g., building), and/or any other object. In another example, the training component 446 may receive annotated data from an application, system, and/or other entity. In examples, annotated data may be received for various frames. Further, in examples annotated data may be received over time for various environments. Annotated data may be stored by the computing device in a data store and accessed at any time.

The training component 446 may train the MLM 436 to output a particular output yaw when one or more inputs are input into the machine learned model. The training may be based on sensor data and/or data indicating one or more ground truth yaws for the sensor data. For instance, the training component 446 may process the sensor data with a perception system, like the perception component 422. The perception system may determine tracks for objects represented in the sensor data. The tracks may be determined over time as portions of the sensor data at different times (e.g., frames of the sensor data) are processed and the ground truth yaws may be associated with discrete times on the track. The perception system may also implement any number of techniques to determine yaw angles for objects represented in the sensor data. Example techniques are discussed in further detail herein and may include techniques implemented by the representation generation component 432.

The training component 446 may also determine one or more characteristics associated with a situation in which sensor data was captured. The one or more characteristics may include a velocity of an object or a vehicle when the sensor data was captured, a distance from the vehicle to an object when the sensor data was captured, an amount of time a track has existed (e.g., 3 seconds, 1 minute, etc.), a proximity of the vehicle or the object to a road feature (e.g., intersection, parking lane, etc.) when the sensor data was captured, information about the road features (e.g., a yaw of the road), a geolocation of the vehicle, a confidence of a technique used to generate a bounding box or measured yaw, a covariance associated with the tracking component used to track the object, etc.

In at least some examples, the training component 446 may train the model to generate, as an output yaw, a combination of one or more yaws determined with different techniques and/or using different estimation components (e.g., an average of multiple yaws, a weighted combination of multiple yaws, etc.), a variation of a particular type of bounding box that is most similar to a ground truth bounding box (e.g., a bounding box that is larger than the particular type of bounding box by an amount or is otherwise scaled to the particular type of bounding box), etc.

In some instances, the map(s) 446 can be similar to the map(s) 430. The map(s) 446 may provide information to aspects of the perception component 422.

The processor(s) 416 of the vehicle 402 and the processor(s) 442 of the computing device(s) 4440 can be any suitable processor capable of executing instructions to process data and perform operations as described herein. By way of example and not limitation, the processor(s) 416 and 442 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 418 and the memory 444 are examples of non-transitory computer-readable media. The memory 418 and the memory 444 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the vehicle 402 can be associated with the computing device(s) 440 and/or components of the computing device(s) 440 can be associated with the vehicle 402. That is, the vehicle 402 can perform one or more of the functions associated with the computing device(s) 440, and vice versa. Further, aspects of the perception system 422 and/or the training component 446 can be performed on any of the devices discussed herein.

FIGS. 5 and 6 illustrate example processes 500, 600 to perform the techniques discussed herein. The processes 500, 600 are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. The processes 500 and/or the process 600 may be performed by any device or component.

In more detail, the process 500 includes, at an operation 502, receiving data indicating a ground truth yaw. In one example, a computing device, such as the computing device(s) 440, e.g., implementing the training component 446, may receive user annotated data indicating ground truth yaws that have been designated by one or more users. Here, a user may view sensor data through a display on a client device and provide input to position a bounding box around or associate a directional indicator (e.g., an arrow or line) with an object to designate a ground truth yaw (e.g., via a mouse, touch screen, or other device to draw a box, place a box and update a corner of the box, draw a line or arrow, etc.). In some instances, the user or the computing device may designate an identifier for a ground truth yaw, such as an identifier that identifies a type of object (e.g., a classification associated with the object), a unique identifier that identifies a specific object with which the ground truth yaw is associated, etc. An object may include a vehicle, person, sign, road, structure (e.g., building), and/or any other object. In another example, the computing device may receive annotated data from an application, system, and/or other entity. In examples, annotated data may be received for various frames. Further, in examples annotated data may be received over time for various environments. Annotated data may be stored by the computing device in a data store and accessed at any time.

At an operation 504, the process 500 includes training a machine learned model based on the ground truth yaw. For example, a computing device, such as the computing device(s) 440, e.g., implementing the training component 446, may train the machine learned model to output a particular output yaw when one or more inputs are input into the machine learned model. The training may be based on sensor data, representations generated based on the sensor data, estimations based on those representations and/or sensor data, the ground truth yaw information, and/or other factors. For instance, and without limitation, the process 500 can include considering outputs from sensors, from perceptions systems, including the perception component 422, from representation generation systems, such as the representation generation components 432, from tracking systems, such as the tracking component 434, from estimation systems, such as the estimation component 308, and/or other sources. Without limitation other information used to train the model can include one or more characteristics associated with a situation in which sensor data was captured. The one or more characteristics may include a velocity of an object or a vehicle when the sensor data was captured, a distance from the vehicle to an object when the sensor data was captured, an amount of time a track has existed (e.g., 3 seconds, 1 minute, etc.), a proximity of the vehicle or the object to a road feature (e.g., intersection, parking lane, etc.) when the sensor data was captured, a geolocation of the vehicle, a confidence of a technique used to generate a bounding box or other representation, a ratio of empty space to occupied space within a bounding box associated with the sensor data, etc.

At an operation 506, the process 500 includes providing the machine learned model to a system including one or more sensors. In one example, a computing device, such as the computing device(s) 440 may send the machine learned model to the vehicle 402 to implement the machine learned model within a system on the vehicle, such as a perception system. In another example, the computing device may be part of a vehicle and the computing device may send the machine learned model to a system on the vehicle. In yet other examples, the machine learned model may be sent to other systems, such as any system using machine vision. In examples, the machine learned model is provided over a network.

At an operation 508, the process 500 includes receiving sensor data from the one or more sensors. The system may comprise a computing device on a vehicle and/or any other computing device. The system may be configured to implement the machine learned model that is trained at the operation 110. The sensor data may be captured by the one or more sensors while the system traverses an environment, as generally illustrated in FIG. 1.

At an operation 510, the system may determine an output yaw with the machine learned model. For example, the system may process the sensor data received at the operation 508 to generate multiple bounding boxes or representations for objects represented in the sensor data. The representations may be generated with different techniques. The system may also generate an estimated representation, e.g., including an estimated yaw, from the representations generated using the different techniques. The system may also determine one or more characteristics associated with a situation in which the sensor data was captured, such as a velocity of an object or a vehicle, a distance from the vehicle to an object, etc. The machine learned model may use the measured representations, the estimated representation, and/or the one or more characteristics to output a yaw that is most appropriate.

At operation 512, the process 500 includes modelling object behavior using the output yaw. For example, the system may update a track to designate the output yaw as the yaw, e.g., in association with a bounding box or other representation, that is used for object tracking (also referred to as "state update" or "track update" for an object tracker). In examples, the output yaw may additionally, or alternatively, be used for other operations, such as generating a trajectory for a vehicle, detecting a potential collision with an object, avoiding a collision with an object, providing augmented reality (AR) content for an object, and so on.

FIG. 6 depicts an example process 600 for controlling an autonomous vehicle relative to objects in an environment, as discussed herein. For example, some or all of the process 600 can be performed by the vehicle 102 of FIG. 1 and/or the vehicle 402 and its related components illustrated in and discussed with reference to FIG. 4. For example, some or all of the process 600 can be performed by the localization component 420, the perception component 422, the prediction component 424, the planning component 426, and/or the one or more system controllers 428.

At an operation 602, the process 600 includes receiving, from a machine learned model, an output yaw associated with a sensed object. As detailed herein, a machine learned model may be trained to determine a yaw from sensor data, measured representations derived at least in part from sensor data, estimated representations derived at least in part from measured representations and/or sensor data, and/or other data. In at least some examples, the output yaw can be associated with a bounding box or other representation of the object.

At an operation 604, the process 600 includes generating, based at least in part on the output yaw, track information for the sensed object. For example, the tracking component 434 and/or other aspects of the perception component 422 may receive the output yaw and associated the output yaw with other state information about the sensed object. In examples, this state information may be used to update or generate a track for the object.

At an operation 606, the process 600 includes generating, based at least in part on the track information, a trajectory relative to the sensed object. For example, the planning component 426 of the vehicle computing device(s) 404 can further determine relative movement, e.g., velocity and acceleration, of the objects in the environment using one or more sensor modalities, object classification data, the maps and/or other information to determine the trajectory. For example, the trajectory may define at least a portion of a travel path for the vehicle.

At an operation 608, the process 600 can include controlling an autonomous vehicle to follow the trajectory. In some instances, the operation 608 can include generating commands that can be relayed to a controller onboard an autonomous vehicle to control the autonomous vehicle to drive the travel path. Although discussed in the context of an autonomous vehicle, the process 600, and the techniques and systems described herein, can be applied to a variety of systems utilizing sensors.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A. An example method includes: receiving sensor data from one or more sensors associated with an autonomous vehicle, the sensor data representative of an object in an environment; determining, based at least in part on a first portion of the sensor data, a first representation of the object, the first representation including a first measured yaw for the object; determining, based at least in part on a second portion of the sensor data, a second representation of the object, the second representation including a second measured yaw for the object; determining, based at least in part on the first measured yaw and the second measured yaw, an estimated yaw for the object; inputting the first measured yaw, the second measured yaw, and the estimated yaw into a machine learned model; receiving, from the machine learned model, an output yaw for the object; and controlling the autonomous vehicle relative to the object based at least in part on the output yaw.

B. The method of example A, wherein the inputting further comprises inputting additional data into the machine learned model, the additional data comprising at least one of: a distance of the object to the autonomous vehicle; a classification of the object; information about a road segment associated with the object; a confidence associated with the first measured yaw; a confidence associated with the second measured yaw; or a covariance associated with the estimated yaw.

C. The method of example A or example B, wherein: the determining the first representation comprises determining, based at least in part on the first portion of the sensor data and with a first technique, the first representation; and the determining the second representation comprises determining, based at least in part on the second portion of the sensor data and with a second technique, the second representation.

D. The method of any one of example A through example C, further comprising: receiving additional sensor data, the additional sensor data comprising additional instances of the sensor data; determining, based at least in part on the additional sensor data and with the first technique, additional instances of the first measured yaw; determining, based at least in part on the additional sensor data and with the second technique, additional instances of the second measured yaw; determining, based at least in part on the additional instances of the first measured yaw and the additional instances of the second measured yaw, additional instances of the estimated yaw; and inputting the additional instances of the first measured yaw, the additional instances of the second measured yaw, and the additional instances of the estimated yaw into the machine learned model with the first measured yaw, the second measured yaw, and the estimated yaw.

E. The method of any one of example A through example D, wherein the determining the estimated yaw comprises using a Bayesian filter.

F. An example system includes: one or more processors; and memory storing executable instructions that, when executed by the one or more processors, cause the one or more processors to perform operations comprising: receiving sensor data from one or more sensors; determining, based at least in part on a first portion of the sensor data, a measured yaw associated with an object in an environment; determining, based at least in part on the measured yaw, an estimated yaw associated with the object; inputting the measured yaw and the estimated yaw into a machine learned model; receiving, from the machine learned model, an output yaw; and determining a track of the object in the environment based at least in part on the output yaw.

G. The system of example F, wherein the measured yaw is a first measured yaw and determining the first measured yaw comprises using a first technique, the operations further comprising: determining, based at least in part on a second portion of the sensor data and using a second technique, a second measured yaw; and inputting the second measured yaw into the machine learned model with the first measured yaw and the estimated yaw.

H. The system of example F or example G, wherein: the sensor data comprises first sensor data from a first sensor modality and second sensor data from a second sensor modality; the first yaw is determined based at least in part on the first sensor data; and the second measured yaw is determined based at least in part on the second sensor data.

I. The system of any one of example F through example H, wherein the first sensor data and the second sensor data comprise one or more of LiDAR data, image data, or radar data.

J. The system of any one of example F through example I, wherein the sensor data is associated with a first time, the operations further comprising: receiving additional sensor data associated with one or more additional times; determining, based at least in part on the additional sensor data, one or more additional instances of the measured yaw; determining, based at least in part on the one or more additional instances of the measured yaw, one or more additional instances of the estimated yaw; and inputting the one or more additional instances of the measured yaw and the one or more additional instances of the estimated yaw into the machine learned model with the measured yaw and the estimated yaw.

K. The system of any one of example F through example J, the operations further comprising: inputting into the machine learned model map information comprising at least one of an identification of a road segment proximate the object or a yaw of the road segment.

L. The system of any one of example F through example K, the operations further comprising: inputting into the machine learned model one or more of a classification of the object, a distance to the object, a first confidence associated with the measured yaw, or a second confidence associated with the estimated yaw.

M. The system of any one of example F through example L, wherein the determining the estimated yaw is based at least in part on using a Bayesian filter and the Bayesian filter further determines a first covariance.

N. The system of any one of example F through example M, the operations further comprising: receiving, from the machine learned model, a second covariance associated with the estimated yaw, wherein the second covariance is different from the first covariance.

O. The system of any one of example F through example N, wherein the generating the track comprises: updating, as an updated track, previous track based at least in part on the output yaw, the updated track comprising one or more of historical positions, historical velocities, historical orientations, or historical accelerations of the object, the operations further comprising: determining a trajectory relative to the object based at least in part on the updated track; and controlling an autonomous vehicle based at least in part on the trajectory.

P. One or more example non-transitory computer-readable media storing instructions that, when executed, cause one or more processors to perform acts comprising: receiving sensor data from one or more sensors associated with a vehicle; determining, based at least in part on a first portion of the sensor data and using a first technique, a first measured yaw associated with an object in an environment; determining, based at least in part on a second portion of the sensor data and using a second technique, a second measured yaw associated with the object; determining, based at least in part on the first measured yaw and the second measured yaw, an estimated yaw associated with the object; inputting the first measured yaw, the second measured yaw, and the estimated yaw into a machine learned model; receiving, from the machine learned model, an output yaw; and determining a track of the object.

Q. The one or more non-transitory computer-readable media of example P, wherein the sensor data is associated with a first time, the acts further comprising: receiving additional sensor data associated with one or more additional times; determining, based at least in part on the additional sensor data, one or more additional instances of the first measured yaw and one or more additional instances of the second measured yaw; determining, based at least in part on the one or more additional instances of the measured yaw and the one or more additional instances of the second measured yaw, one or more additional instances of the estimated yaw; and inputting the one or more additional instances of the first measured yaw, the one or more additional instances of the second measured yaw, and the one or more additional instances of the estimated yaw into the machine learned model with the first measured yaw, the second measured yaw, and the estimated yaw.

R. The one or more non-transitory computer-readable media of example P or example Q, the acts further comprising: inputting into the machine learned model one or more of a classification of the object, a distance of the object to the vehicle, a first confidence associated with the first measured yaw, a second confidence associated with the second measured yaw, or a third confidence associated with the estimated yaw.

S. The one or more non-transitory computer-readable media of any one of example P through example R, the acts further comprising: inputting into the machine learned model map information comprising at least one of an identification of a road segment proximate the object or a yaw of the road segment.

T. The one or more non-transitory computer-readable media of any one of example P through example S, wherein the determining the estimated yaw is based at least in part on using a Bayesian filter.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
  receiving sensor data from one or more sensors associated with an autonomous vehicle, the sensor data representative of an object in an environment;
  determining, based at least in part on a first portion of the sensor data and using a first technique, a first representation of the object, the first representation including a first measured yaw for the object;
  determining, based at least in part on a second portion of the sensor data and using a second technique different than the first technique, a second representation of the object, the second representation including a second measured yaw for the object;
  determining, based at least in part on the first measured yaw and the second measured yaw, an estimated yaw for the object;
  inputting the first measured yaw, the second measured yaw, and the estimated yaw into a machine learned model;
  receiving, from the machine learned model, an output yaw for the object; and
  controlling the autonomous vehicle relative to the object based at least in part on the output yaw.

2. The method of claim 1, wherein the inputting further comprises inputting additional data into the machine learned model, the additional data comprising at least one of:
  a distance of the object to the autonomous vehicle;
  a classification of the object;
  information about a road segment associated with the object;
  a first confidence associated with the first measured yaw;
  a second confidence associated with the second measured yaw; or
  a covariance associated with the estimated yaw.

3. The method of claim 1, further comprising:
receiving additional sensor data, the additional sensor data comprising additional instances of the sensor data;
determining, based at least in part on the additional sensor data and with the first technique, additional instances of the first measured yaw;
determining, based at least in part on the additional sensor data and with the second technique, additional instances of the second measured yaw;
determining, based at least in part on the additional instances of the first measured yaw and the additional instances of the second measured yaw, additional instances of the estimated yaw; and
inputting the additional instances of the first measured yaw, the additional instances of the second measured yaw, and the additional instances of the estimated yaw into the machine learned model with the first measured yaw, the second measured yaw, and the estimated yaw.

4. The method of claim 1, wherein the determining the estimated yaw comprises using a Bayesian filter.

5. The method of claim 1, wherein the inputting further comprises inputting a first confidence associated with the first measured yaw and a second confidence associated with the second measured yaw.

6. The method of claim 1, wherein the first portion of the sensor data is generated by a first sensor and the second portion of the sensor data is generated by a second sensor different than the first sensor.

7. A system comprising:
one or more processors; and
memory storing executable instructions that, when executed by the one or more processors, cause the one or more processors to perform operations comprising:
receiving sensor data from one or more sensors;
determining, based at least in part on a first portion of the sensor data and using a first technique, a first measured yaw associated with an object in an environment;
determining, based at least in part on a second portion of the sensor data and using a second technique different than the first technique, a second measured yaw associated with the object;
determining, based at least in part on the first measured yaw and the second measured yaw, an estimated yaw associated with the object;
inputting the first measured yaw, the second measured yaw, and the estimated yaw into a machine learned model;
receiving, from the machine learned model, an output yaw; and
determining a track of the object in the environment based at least in part on the output yaw.

8. The system of claim 7, wherein:
the sensor data comprises first sensor data from a first sensor modality and second sensor data from a second sensor modality;
the first measured yaw is determined based at least in part on the first sensor data; and
the second measured yaw is determined based at least in part on the second sensor data.

9. The system of claim 8, wherein the first sensor data and the second sensor data comprise one or more of LiDAR data, image data, or radar data.

10. The system of claim 7, wherein the sensor data is associated with a first time, the operations further comprising:
receiving additional sensor data associated with one or more additional times;
determining, based at least in part on the additional sensor data, one or more additional instances of the measured yaw;
determining, based at least in part on the one or more additional instances of the measured yaw, one or more additional instances of the estimated yaw; and
inputting the one or more additional instances of the measured yaw and the one or more additional instances of the estimated yaw into the machine learned model with the measured yaw and the estimated yaw.

11. The system of claim 7, the operations further comprising:
inputting map information into the machine learned model, the map information comprising at least one of an identification of a road segment proximate the object or a yaw of the road segment.

12. The system of claim 7, the operations further comprising:
inputting, into the machine learned model, one or more of a classification of the object, a distance to the object, a first confidence associated with the measured yaw, or a second confidence associated with the estimated yaw.

13. The system of claim 7, wherein the determining the estimated yaw is based at least in part on using a Bayesian filter and the Bayesian filter further determines a first covariance.

14. The system of claim 13, the operations further comprising:
receiving, from the machine learned model, a second covariance associated with the estimated yaw, wherein the second covariance is different from the first covariance.

15. The system of claim 7, wherein determining the track comprises:
updating, as an updated track, previous track based at least in part on the output yaw, the updated track comprising one or more of historical positions, historical velocities, historical orientations, or historical accelerations of the object, the operations further comprising:
determining a trajectory relative to the object based at least in part on the updated track; and
controlling an autonomous vehicle based at least in part on the trajectory.

16. One or more non-transitory computer-readable media storing instructions that, when executed, cause one or more processors to perform acts comprising:
receiving sensor data from one or more sensors associated with a vehicle;
determining, based at least in part on a first portion of the sensor data and using a first technique, a first measured yaw associated with an object in an environment;
determining, based at least in part on a second portion of the sensor data and using a second technique different than the first technique, a second measured yaw associated with the object;
determining, based at least in part on the first measured yaw and the second measured yaw, an estimated yaw associated with the object;
inputting the first measured yaw, the second measured yaw, and the estimated yaw into a machine learned model;

receiving, from the machine learned model, an output yaw; and determining a track of the object.

17. The one or more non-transitory computer-readable media of claim 16, wherein the sensor data is associated with a first time, the acts further comprising:
- receiving additional sensor data associated with one or more additional times;
- determining, based at least in part on the additional sensor data, one or more additional instances of the first measured yaw and one or more additional instances of the second measured yaw;
- determining, based at least in part on the one or more additional instances of the first measured yaw and the one or more additional instances of the second measured yaw, one or more additional instances of the estimated yaw; and
- inputting the one or more additional instances of the first measured yaw, the one or more additional instances of the second measured yaw, and the one or more additional instances of the estimated yaw into the machine learned model with the first measured yaw, the second measured yaw, and the estimated yaw.

18. The one or more non-transitory computer-readable media of claim 16, the acts further comprising:
- inputting, into the machine learned model, one or more of a classification of the object, a distance of the object to the vehicle, a first confidence associated with the first measured yaw, a second confidence associated with the second measured yaw, or a third confidence associated with the estimated yaw.

19. The one or more non-transitory computer-readable media of claim 16, the acts further comprising:
- inputting map information into the machine learned model, the map information comprising at least one of an identification of a road segment proximate the object or a yaw of the road segment.

20. The one or more non-transitory computer-readable media of claim 16, wherein the determining the estimated yaw is based at least in part on using a Bayesian filter.

* * * * *